United States Patent
Mochizuki

(10) Patent No.: US 7,034,309 B2
(45) Date of Patent: Apr. 25, 2006

(54) RADIATION DETECTING APPARATUS AND METHOD OF DRIVING THE SAME

(75) Inventor: Chiori Mochizuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 10/290,530

(22) Filed: Nov. 8, 2002

(65) Prior Publication Data

US 2005/0145800 A1    Jul. 7, 2005

(30) Foreign Application Priority Data

Nov. 13, 2001  (JP)  ............................ 2001-347931

(51) Int. Cl.
*G01T 1/24*  (2006.01)

(52) U.S. Cl. ..................... 250/370.09; 250/370.01; 250/336.1

(58) Field of Classification Search .......... 250/370.09, 250/370.01, 336.1
See application file for complete search history.

(56) References Cited

U.S. PATENT DOCUMENTS

| | | | |
|---|---|---|---|
| 5,539,461 A * | 7/1996 | Andoh et al. ................ 348/308 |
| 5,965,872 A | 10/1999 | Endo et al. ................ 250/208.1 |
| 6,021,173 A * | 2/2000 | Brauers et al. ............. 378/98.8 |
| 6,512,543 B1 * | 1/2003 | Kuroda et al. .............. 348/302 |
| 2002/0145117 A1 | 10/2002 | Mochizuki ............. 250/370.09 |
| 2004/0090405 A1 * | 5/2004 | Izumi .......................... 345/87 |
| 2004/0114719 A1 * | 6/2004 | Endo ......................... 378/98.8 |

* cited by examiner

*Primary Examiner*—David Porta
*Assistant Examiner*—Christine Sung
(74) *Attorney, Agent, or Firm*—Fitzpatrick, Cella, Harper & Scinto.

(57) ABSTRACT

A radiation detecting apparatus including a plurality of pixels, each pixel including a conversion element configured to convert radiation into an electric signal, a resetting element configured to reset the conversion element by applying a predetermined voltage to the conversion element, and a signal transfer element connected to the conversion element. The signal transfer element and the resetting element are connected to the same electrode of the conversion element.

8 Claims, 17 Drawing Sheets

RADIATION DETECTING APPARATUS AND METHOD OF DRIVING THE SAME

BACKGROUND OF THE INVENTION

1. Field of the Invention

The present invention relates to a radiation detecting apparatus for detecting radiation such as an X-ray or a γ-ray, and more particularly, to a radiation detecting apparatus suitable for use in a medical image diagnosis apparatus, a non-destructive examination apparatus, an analysis apparatus using radiation, and the like.

2. Description of the Related Art

Imaging methods used in medical diagnostic imaging can be classified into general imaging for obtaining a still image and radiographic imaging for obtaining a moving image. Suitable imaging methods and apparatuses may be selected as required.

One known method of general imaging for obtaining a still image includes exposing a film of a screen-film system (hereinafter referred to as an S/F system) comprised of a combination of a fluorescent plate and a film, developing the film, and then fixing the resultant image. Another known method is computed radiography (CR) in which a radiogram is first recorded in the form of a latent image on a photo-stimulable phosphor plate, and then the photostimulable phosphor plate is scanned with a laser beam and output optical information is read using a sensor.

However, a problem in these methods is that they require complicated work flow to obtain a radiographic image. Another problem is that a digital image can only be obtained indirectly via processing, which requires a long time. That is, a digital image cannot be obtained in real time. Thus, there is less merit in employing the conventional methods described above, compared with digital imaging methods such as computer tomograph (CT) or magnetic resonance imaging (MRI) used in medical diagnosis.

On the other hand, in the radiography for obtaining a moving image, one known method is to use an electron tube as an image intensifier (II). However, this method needs a large-scale apparatus including the electron tube. Also, the field of view or the detection area is typically not large enough to meet the requirements in medical diagnostic imaging. Furthermore, an obtained moving image includes a large amount of crosstalk arising from a specific structure of the apparatus, and it is desirable to reduce crosstalk to obtain a clearer image.

On the other hand, recent advances in the liquid crystal Thin Film Transistor (TFT) technology and information infrastructure have made it possible to realize a flat panel detector (FPD) composed of a sensor array and a fluorescent substance for converting radiation into visible light, wherein the sensor array is made up of optical-to-electrical converters using non-single silicon crystal such as amorphous silicon (a-Si) and switching TFTs. This technique is expected to make it possible to realize large-area imaging in a fully digital form.

The FPD is capable of reading a radiographic image and displaying the image on a display in real time. Another advantage is that a digital image can be obtained directly, and data can be easily stored, processed, and transferred. Although characteristics such as sensitivity depend on imaging conditions, the characteristics are generally similar to or better than the characteristics obtained in the conventional S/F or CR imaging techniques.

FIG. 13 shows a known equivalent circuit of an FPD. In FIG. 13, reference numeral 101 denotes a photoelectric conversion element, 102 denotes a transfer TFT, 103 denotes a driving line for driving the transfer TFT, 104 denotes a signal line, 105 denotes a bias line, 106 denotes a signal processing circuit, 107 denotes a TFT driving circuit, and 108 denotes an A/D converter.

If radiation is incident on the photoelectric conversion element 101, the incident radiation is converted in wavelength into visible light by a fluorescent substance (not shown). The resultant converted light is then converted to an electric charge by the conversion element 101 and stored in the conversion element 101. Thereafter, the TFT driving circuit 107 drives the transfer TFT 102 via the TFT driving line so as to transfer the stored charge to the signal processing circuit 106 via the signal line 104. The charge is processed by the signal processing circuit 106 and then converted by the A/D converter 108 from analog form into digital form. The resultant digital signal is output.

An example of the device structure widely used for the FPD has been described above. As for the optical-to-electrical converter, various device structures such as a p-type layer/intrinsic layer/n-type layer photodiode (PIN PD) and a MIS-type optical-to-electrical converter similar to that employed in the present invention have been proposed.

FIG. 14 is a plan view showing one pixel in which a MIS-type optical-to-electrical converter is used. In FIG. 14, reference numeral 201 denotes a MIS-type optical-to-electrical converter, 202 denotes a transfer TFT, 203 denotes a driving line for driving the transfer TFT, 204 denotes a signal line, 205 denotes a sensor bias line, 211 denotes a gate electrode of a transfer TFT, 212 denotes source and drain electrodes (hereinafter, referred to simply as SD electrodes) of the transfer TFT, and 213 denotes a contact hole.

FIG. 15 is a cross-sectional view of one pixel including various devices shown in FIG. 14. In FIG. 15, reference numeral 301 denotes a glass substrate, 302 denotes a driving line for driving the transfer TFT, 303 denotes a lower electrode of the MIS-type optical-to-electrical converter, 304 denotes a gate electrode of the transfer TFT, 305 denotes a gate insulating film, 306 denotes an intrinsic a-Si film, 307 denotes a hole blocking layer, 308 denotes a bias line, 309 denotes SD electrodes of the transfer TFT, 310 denotes a signal line, 320 denotes a protective film, 321 denotes an organic resin layer, and 322 denotes a fluorescent substance layer.

As can be seen from FIGS. 14 and 15, the MIS-type optical-to-electrical converter and the transfer TFT have the same layer structure, and thus they can be produced using a simple production method which allows a high production yield and low production cost. Furthermore, the FPD constructed in the above-described manner performs well in various aspects, including sensitivity, and it has come to be used in general imaging applications instead of conventional S/F method and CR method apparatuses.

However, although the FPD has the advantage that a fully digital large-area image can be obtained and the FPD has come to be used widely in general imaging, the FPD according to the conventional technology does not have a high enough reading speed needed in radiographic imaging.

FIG. 16 shows an equivalent circuit of a one-bit portion of an FPD using MIS-type optical-to-electrical converters. In FIG. 16, reference symbol C1 denotes total equivalent capacitance of the MIS-type optical-to-electrical converter, C2 denotes parasitic capacitance associated with the signal line, Vs denotes a sensor bias voltage, Vr denotes a sensor reset voltage, SW1 denotes a switch for selecting Vs or Vr applied to the MIS-type optical-to-electrical converter, SW2 denotes a switch for turning on/off the transfer TFT, SW3 denotes a switch for resetting the signal line, and Vout denotes an output voltage.

When the switch SW1 is at the Vs position, the voltage Vs is applied as a bias voltage to the MIS-type optical-to-electrical converter such that the semiconductor layer of the MIS-type optical-to-electrical converter is depleted. In this state, if light converted via the fluorescent substance is incident on the semiconductor layer, a positive charge blocked by the hole blocking layer is accumulated into the a-Si layer, and a voltage difference Vt occurs. Thereafter, when the on-voltage is applied to the transfer TFT via the SW2, the voltage Vout is output. The output voltage Vout is read by a reading circuit (not shown). After that, the signal line is reset by the switch SW3, and reading is performed sequentially.

By sequentially turning on transfer TFTs on a line-by-line basis according to the driving scheme described above, one entire frame is read. Thereafter, the MIS-type optical-to-electrical converter is reset by applying the reset voltage Vr to it via the SW1, and the bias voltage Vs is again applied thereby causing the charge accumulation to start in the reading operation.

For example, when the FPD has pixels with a size of 160 µm disposed in a pixel area with a size of 43 cm×43 cm, the total equivalent capacitance C1 of the MIS-type optical-to-electrical converter is about 1 pf and the parasitic capacitance C2 is about 50 pf. In such an FPD, when the charge is transferred, about 2% of the charge remains in the capacitor C1 without being transferred because of the charge sharing effect. Thus, to obtain a high-quality image, it is necessary to perform the resetting operation described above.

More specifically, the resetting operation needs ten msec or a few ten msec for each frame, depending on the resetting condition. Therefore, when it is desired to take a radiographic image at a rate of 30 frames per second (FPS) or at a higher rate, it is required to perform reading and resetting on all lines of one frame within a period of 33 msec (30 FPS).

FIG. 17 is a diagram showing a conventional method of driving an FPD. In FIG. 17, reference symbol T1 denotes a period of time needed to read one line, T2 denotes a period of time needed to read all lines, T3 denotes a reset time, and T denotes a period of time needed to perform the entire process on one frame. In the case in which it takes 33 msec to perform the entire process on one frame as described above, if the reset time T3 is equal to 15 msec, then T2 becomes 18 msec. Therefore, if there are 1500 lines to be read, the period of time T1 available for reading one line becomes 12 µsec. If a radiation exposure time, that is, a sensor accumulation time is taken into account, the reading period T1 is further limited. Thus, it becomes necessary to increase the transfer capacity of the transfer TFT. However, to increase in the transfer capacity of the transfer TFT, it is necessary to increase the size of the transfer TFT at the cost of the aperture ratio, which causes various problems such as a reduction in sensitivity, degradation in image quality, and an increase in the amount of radiation necessary to generate an image.

That is, a trade-off is needed between the high image quality and the high speed at which the FPD is driven to obtain a moving image. In other words, at present, it is impossible to achieve a high-speed moving image having high quality.

In view of the above, U.S. Pat. No. 5,869,837 to Huang discloses a radiographic image forming system including resetting means for periodically resetting capacitively coupled radiation detection means. However, in this radiographic image forming system, a protective film of a reading switch is also used as an insulating film of a reset switch. Also the connection position of the reset switch disclosed does not necessarily allow the radiation detection means to be fully reset. Thus there is some room for improvement in the layer structure and in resetting of the radiation detection means.

SUMMARY OF THE INVENTION

According to one aspect of the present invention, there is provided a radiation detecting apparatus including a plurality of pixels, each pixel including a conversion element configured to convert radiation into an electric signal, a resetting element configured to reset the conversion element by applying a predetermined voltage to the conversion element, and a signal transfer element connected to the conversion element. The signal transfer element and the resetting element are connected to the same electrode of the conversion element.

In this radiation detecting apparatus, it is desirable to form the conversion element on the signal transfer element and also on the resetting element to further improve the aperture ratio.

According to another aspect of the present invention, there is provided a method of driving a radiation detecting apparatus including an array of pixels each including detection means for detecting radiation, transfer means for transferring a detected signal, and resetting means for resetting the signal by applying a voltage to the detection means, the method comprising performing a signal transfer operation of pixels in a specific row in a period of time in which a signal resetting operation is being performed for a row the signal transfer operation for which has been completed before starting the signal transfer operation for the specific row.

Further objects, features and advantages of the present invention will become apparent from the following description of the preferred embodiments with refer to the attached drawings.

DESCRIPTION OF THE PREFERRED EMBODIMENTS

Preferred embodiments of the present invention will now be described in further detail below with reference to the accompanying drawings.

First Embodiment

In this first embodiment, of the present invention, there is disclosed an FPD-type X-ray detecting apparatus using a MIS-type optical-to-electrical converter as a sensor portion.

Figure 1:
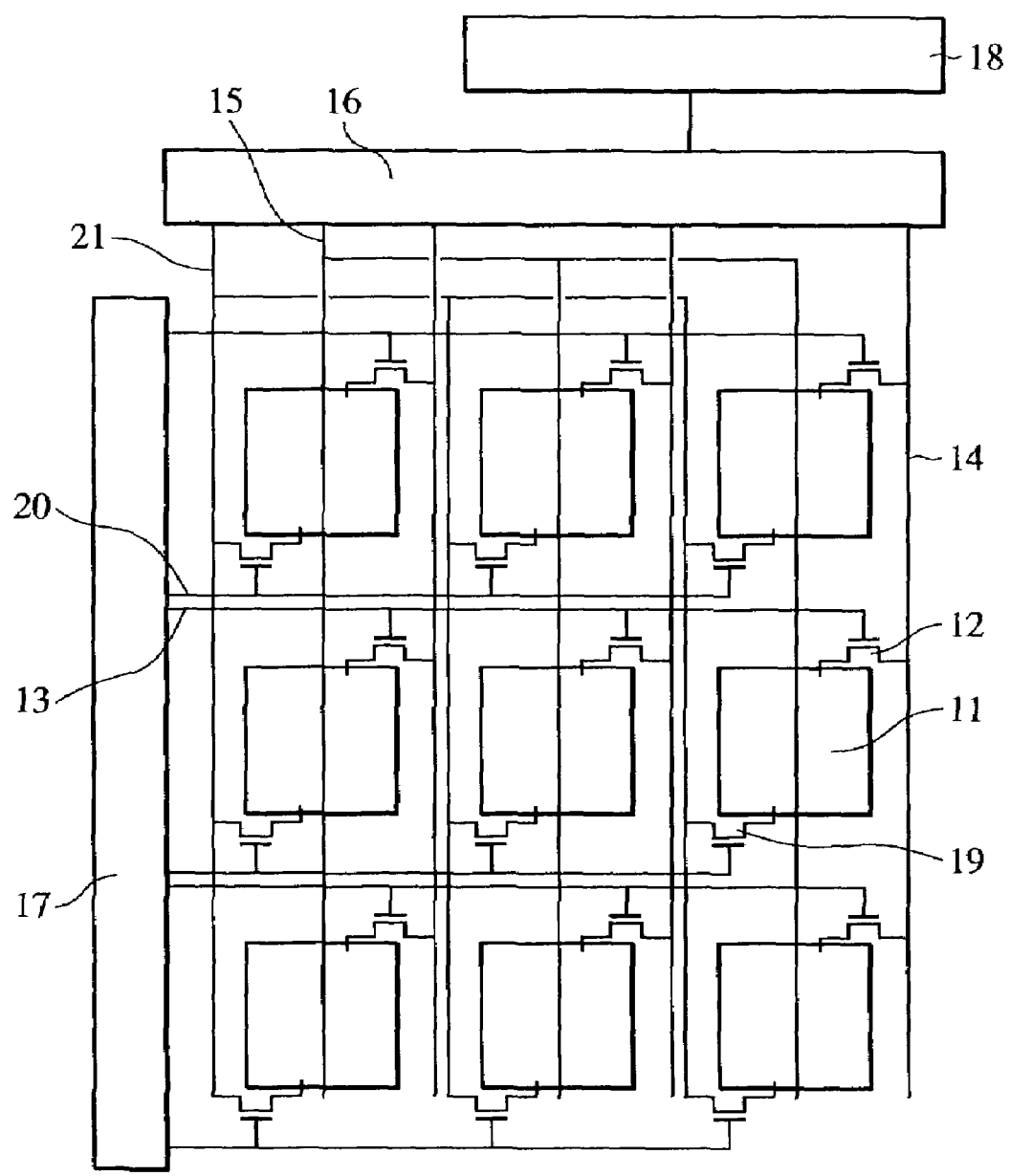
FIG. 1 is a circuit diagram showing an equivalent circuit of an X-ray detecting apparatus having a 3×3 matrix structure, according to a first embodiment.

FIG. 1 is a circuit diagram showing an equivalent circuit of an X-ray detecting apparatus having a 3×3 matrix structure according to the present embodiment. Although the X-ray detecting apparatus has the 3×3 matrix structure by way of example, the matrix structure may include greater numbers of rows and columns.

In FIG. 1, reference numeral 11 denotes an individual MIS-type photoelectric conversion element, 12 denotes a first thin-film transistor (switching element) serving as a transfer TFT, 13 denotes a transfer TFT driving line 14 denotes a signal line, 15 denote a bias line, 16 denotes a signal processing circuit, 17 denotes a TFT driving circuit, 18 denotes an A/D converter, 19 denotes a second switching element serving as a reset TFT, 20 denotes a driving line for driving the reset TFT, and 21 denotes a resetting line.

A radiation detection part is formed of the photoelectric conversion element 11 and a wavelength conversion element, described later, for converting the wavelength of radiation. As described above, the X-ray detecting apparatus according to the present embodiment includes switching means for switching an electric signal output from the MIS-type optical-to-electrical converter 11, wherein one of the switching means is the TFT 12 serving as a transfer element for transferring the electric signal, and the other one is the TFT 19 serving as a resetting element for resetting the electric signal by applying a constant voltage to the MIS-type optical-to-electrical converter 11.

Incident X-ray radiation is converted into visible light by a wavelength conversion element such as a cesium iodide (CsI) or $Gd_2O_2S$ (Gadolinium OxySulphide) (GOS), and the resultant visible light is incident on the MIS-type photoelectric conversion element 11. The incident light is converted into an electric charge by the MIS-type photoelectric conversion element 11, and the resultant electric charge is stored in the MIS-type photoelectric conversion element 11. Thereafter, the transfer TFT 12 is turned on to read the stored electric charge. The reset TFT 19 is then turned on to reset the signal charge stored in the MIS-type photoelectric conversion element. In the alternative, the electric charge may also be stored in an additionally provided storage capacitor.

Figure 2:
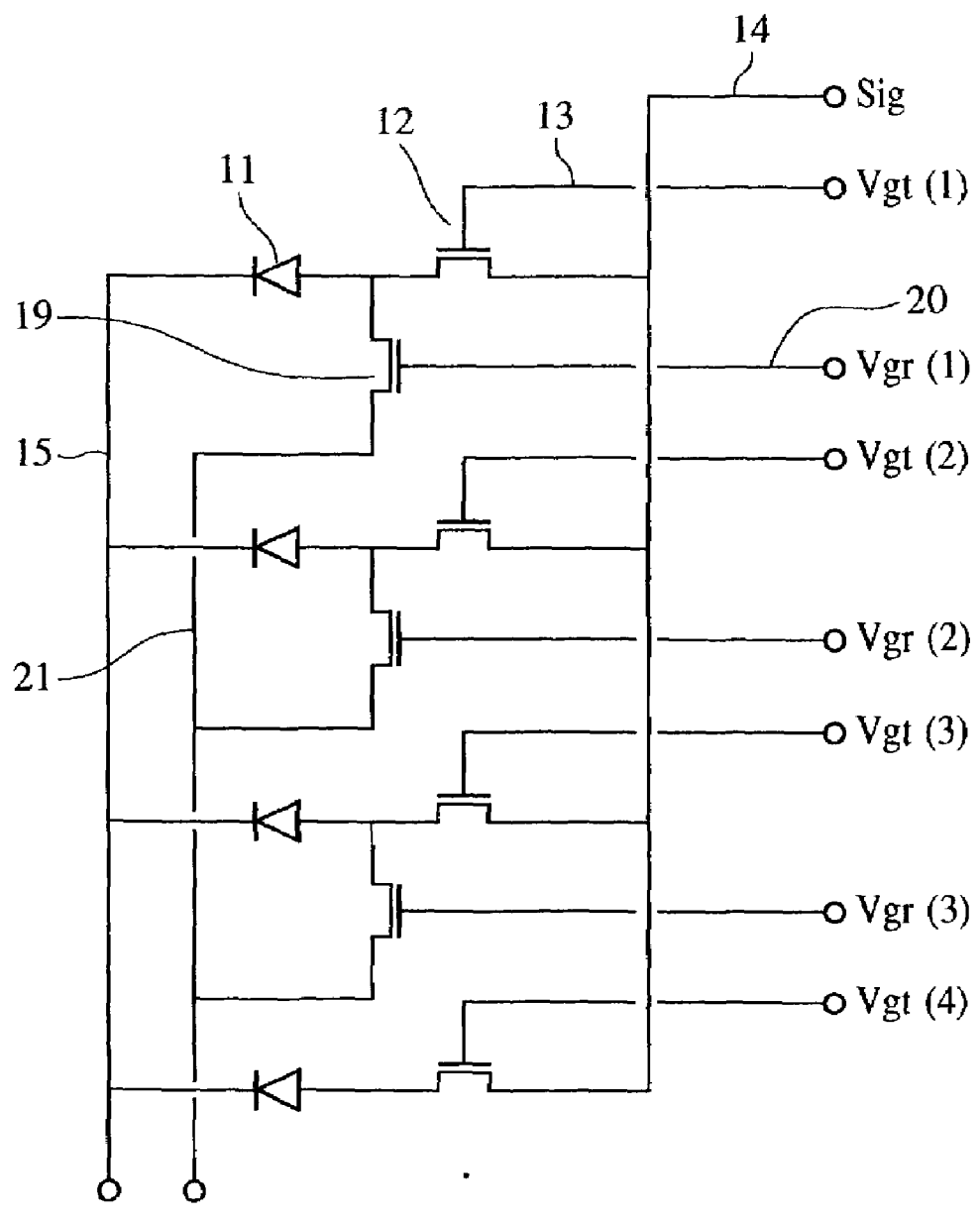
FIG. 2 is a circuit diagram showing an equivalent circuit of an X-ray detecting apparatus having a 3×1 matrix structure.

FIG. 2 is a circuit diagram showing an equivalent circuit of an X-ray detecting apparatus having a 3×1 matrix structure. In this figure, similar parts to those in FIG. 1 are denoted by similar reference numerals. When an on-voltage is applied to a transfer TFT via a node Vgt(1), a signal is output via a line Sig. If an on-voltage is applied to a reset TFT via a node Vgr(1), a sensor is reset. Similarly, when an on-voltage is applied to a transfer TFT via a node Vg(2), a signal is output via the line Sig. Thereafter, an on-voltage is applied to a reset TFT via a node Vgr(2) to reset a sensor. By sequentially applying Vgt(1), Vgr(1), Vgt(2), Vgr(2), . . . , Vgt(4), Vgr(4) shown in FIG. 2 in a similar manner as described above, it is possible to perform reading of a moving image and resetting.

Figure 3:
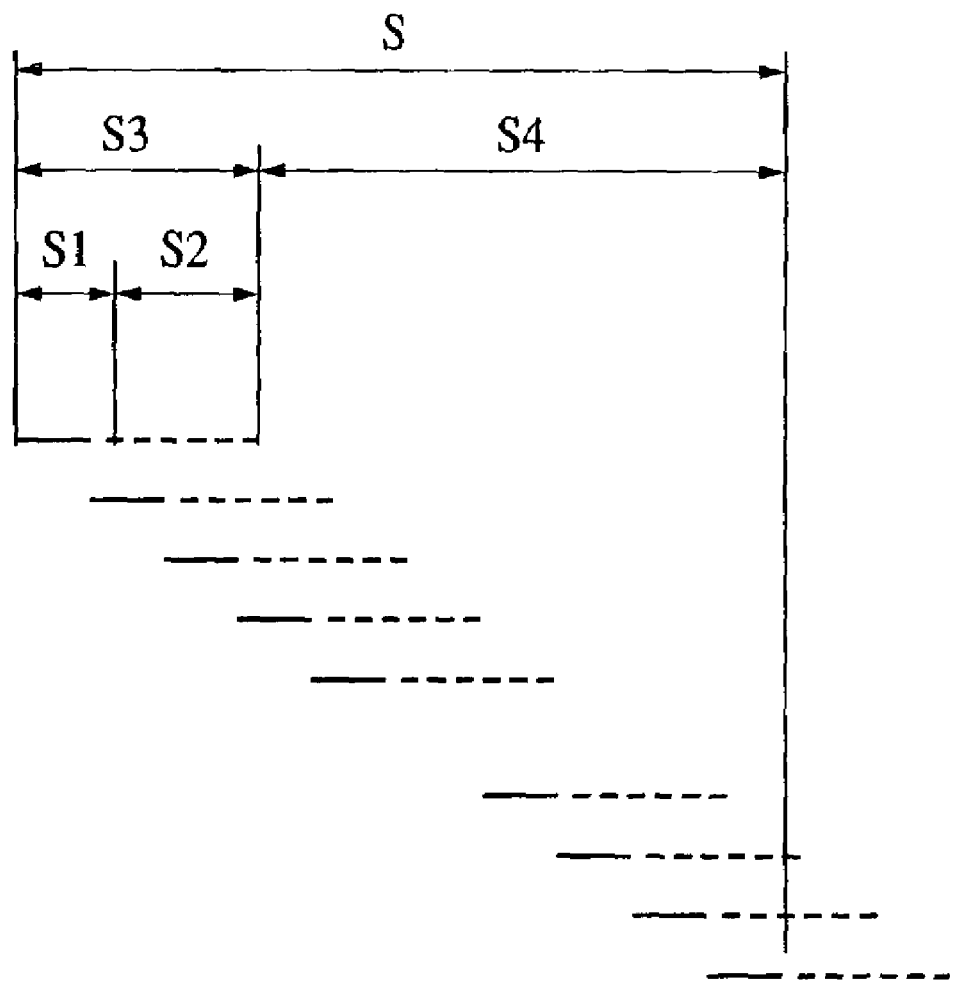
FIG. 3 is a diagram showing a method of driving the X-ray detecting apparatus having a 3×3 matrix according to the first embodiment.

FIG. 3 is a diagram showing a method of driving the X-ray detecting apparatus according to the present embodiment. In FIG. 3, reference symbol S1 denotes a period of time needed to read one line, S2 denotes a period of time needed to reset one line, S4 denotes a period of time needed to accumulate an electric charge into a sensor, and S denotes a period of time needed to perform the entire process on one frame.

In the present embodiment, unlike the conventional method in which sequential reading and resetting and exposure to radiation for all pixels are performed repeatedly, reading, resetting, and storing are performed on a line-by-line basis, and thus the total driving time is substantially equal to the sum of reading times. That is, when reading and transferring of signals from pixels in one line are being performed, resetting of already-read pixels in a previous line is performed. This makes it possible to drive the X-ray detecting apparatus at a high driving rate of 30 FPS or higher to obtain a moving image without causing degradation in image quality.

Figure 4:
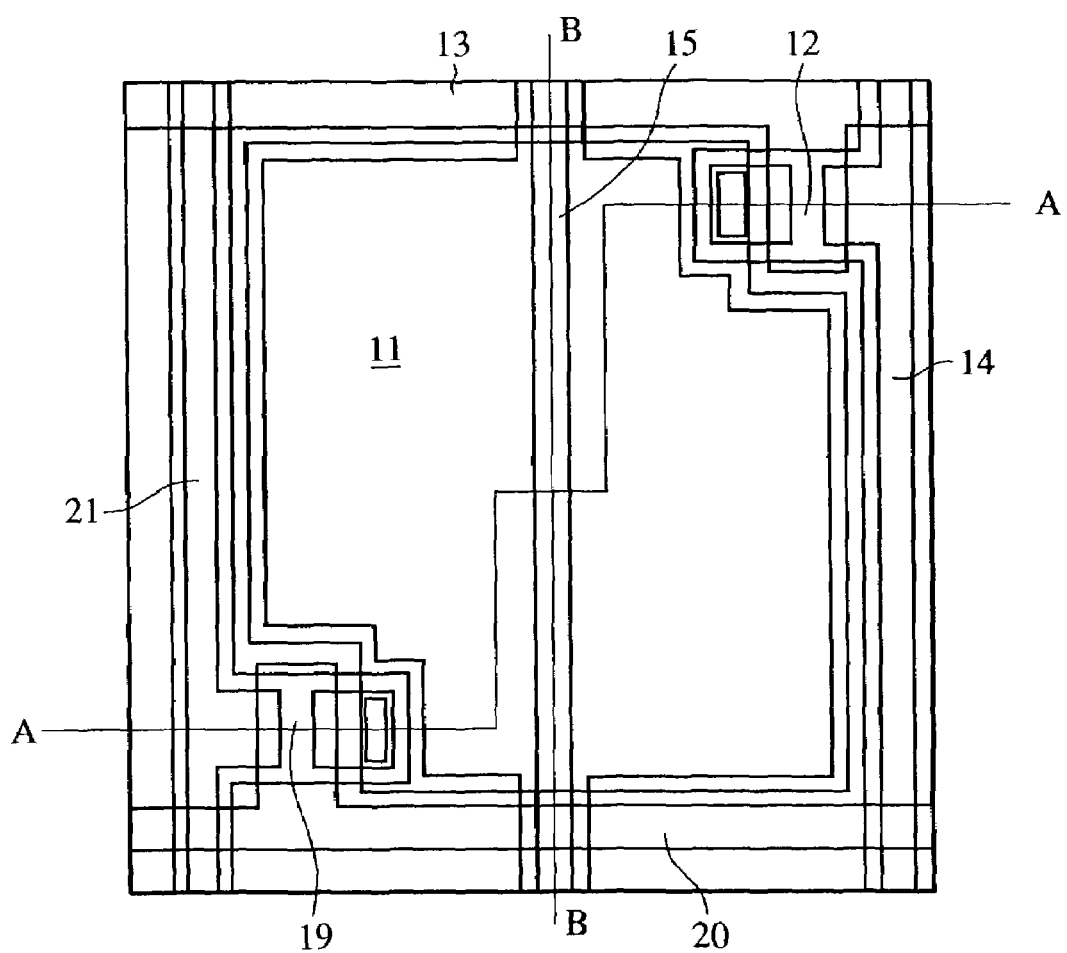
FIG. 4 is a plan view showing one pixel of the X-ray detecting apparatus having a 3×3 matrix according to the first embodiment.
Figure 18:
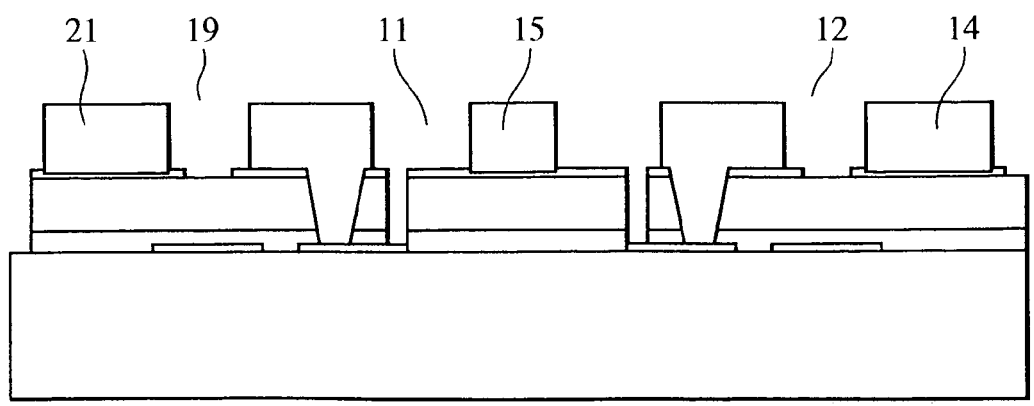
FIG. 18 is a cross-sectional view taken along line A—A of FIG. 4.
Figure 19:
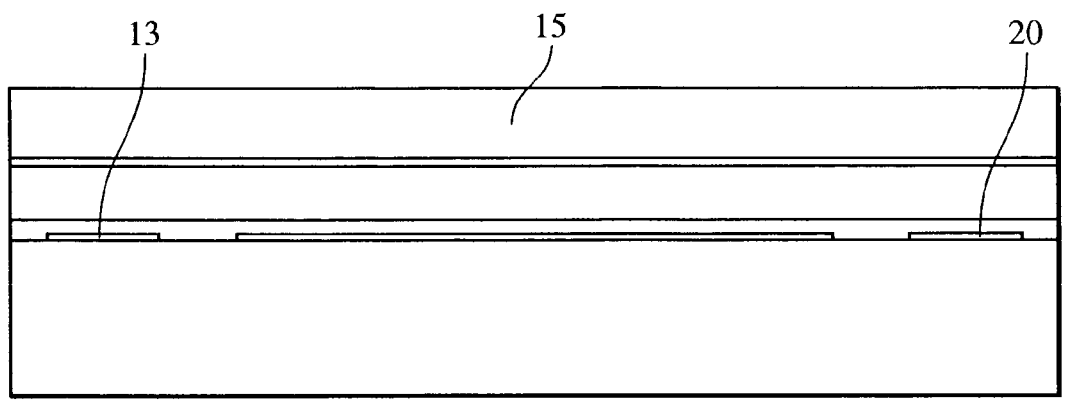
FIG. 19 is a cross-sectional view taken along line B—B of FIG. 4.

FIG. 4 is a plan view showing one pixel of the X-ray detecting apparatus according to the present embodiment. In FIG. 4, similar parts to those in FIG. 1 are denoted by similar reference numerals. In FIG. 4, the transfer TFT 12 and the reset TFT 19 are disposed in diagonally opposite corners of the pixel in order to achieve an optimum layout including the driving line and the signal line. FIG. 18 is a cross-sectional view taken along line A—A of FIG. 4, and FIG. 19 is a cross-sectional view taken along line B—B of FIG. 4. In those figures, similar functional parts to those in FIG. 1 are denoted by similar reference numerals. As can be seen from FIGS. 18 and 19, the lower electrode of the optical-toelectrical converter (303 shown in FIG. 5A), the gate electrode of the signal transfer TFT, and the gate electrode of the reset TFT are connected together, that is, the signal transfer TFT and the reset TFT are both connected to the same electrode of the optical-to-electrical converter, thereby making it possible to achieve high-performance resetting operation.

Figure 5B:
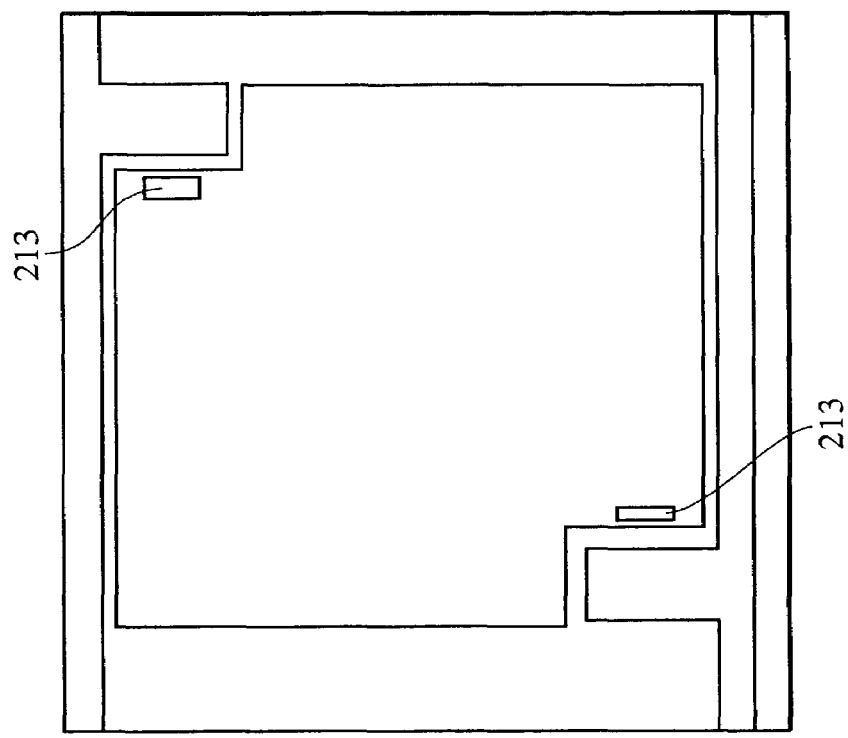
FIGS. 5A and 5B are plan views showing a method of producing the X-ray detecting apparatus according to the first embodiment, wherein steps in a production process are shown.
Figure 5A:
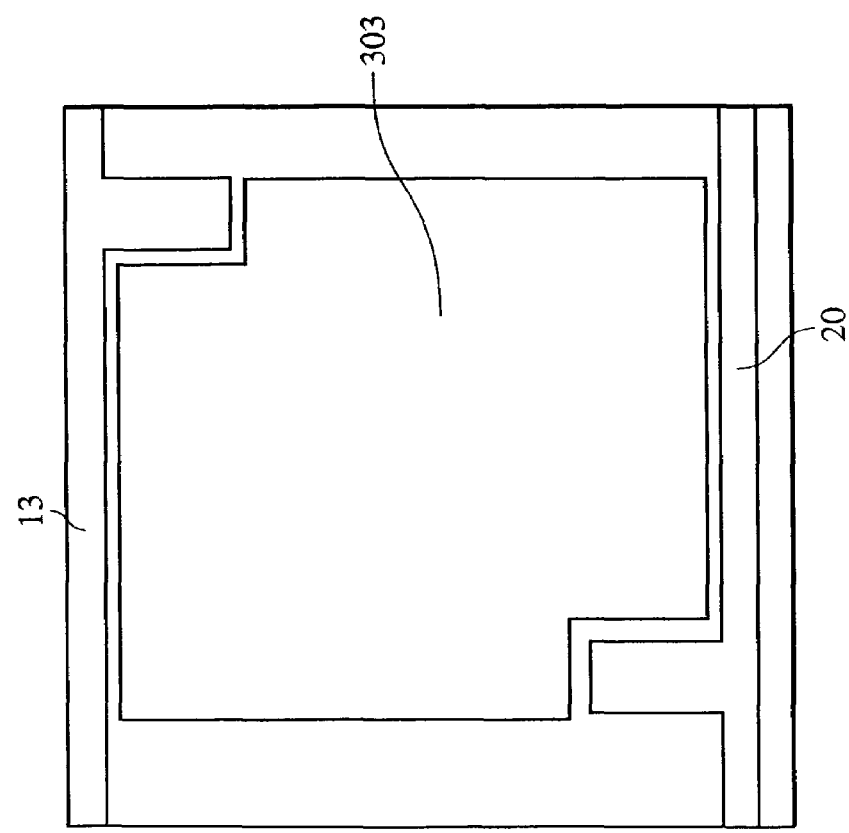

Referring to FIGS. 5 and 6, a method of producing the X-ray detecting apparatus according to the present invention is described below. First, as shown in FIG. 5A, the gate electrode and the driving line 13 of the transfer TFT, the lower electrode 303 of the MIS-type optical-to-electrical converter, and the driving interconnection line 20 of the reset TFT are formed. The gate electrode may be formed by first depositing a thin chromium film with a thickness of about 150 nm by means of sputtering and then patterning it by means of photolithography.

Thereafter, the SiN gate insulating film, the a-Si film, and the n+-film of the TFT and the MIS-type optical-to-electrical converter are formed to thickness of about 300 nm, 600 nm, and 100 nm, respectively, using a plasma CVD apparatus.

Thereafter, as shown in FIG. 5B, a contact hole 213 is formed by means of photolithography using Reactive Ion Etching (RIE) or Chemical Dry Etching (CDE).

Figure 6A:
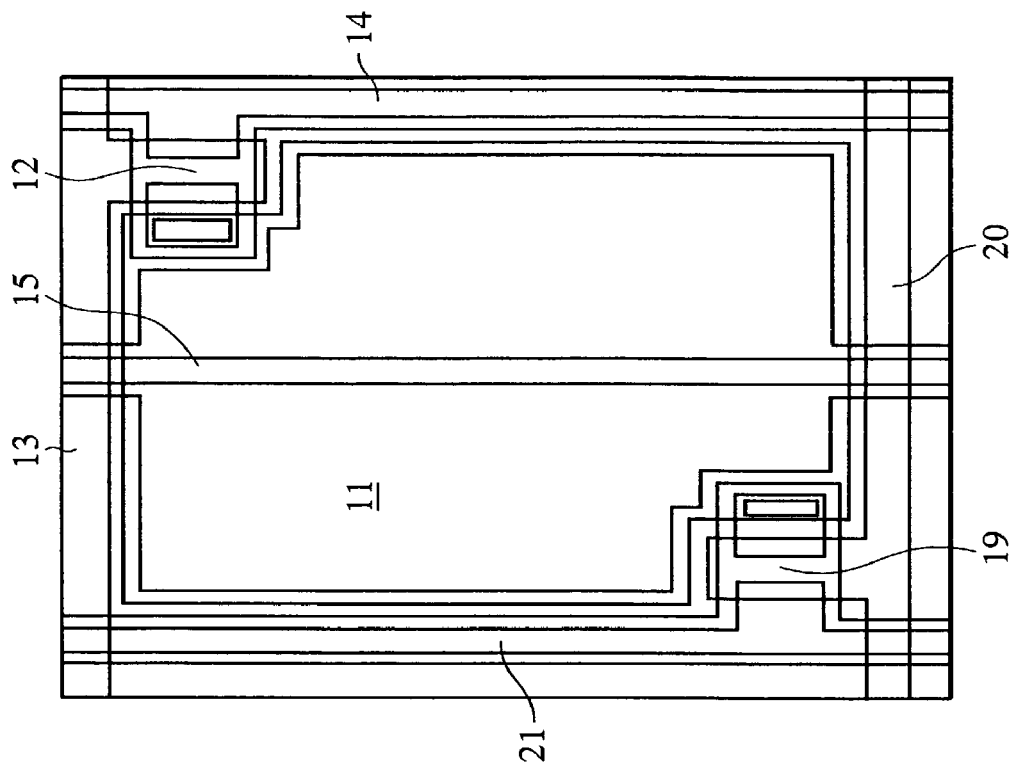
FIGS. 6A and 6B are plan views showing a method of producing the X-ray detecting apparatus according to the first embodiment, wherein steps following those shown in FIG. 5 are shown.

Furthermore, as shown in FIG. 6A, SD electrodes 24 and 25 of the transfer TFT and the reset TFT, the signal line 14, the bias line 15, and the reset line 21 are formed by first depositing a thin aluminum film (with a thickness of about 1 μm) by means of sputtering and then patterning the thin aluminum film by means of photolithography.

Thereafter, the n+-film is removed selectively from the gap regions of the transfer TFT and the reset TFT by means of RIE.

Figure 6B:
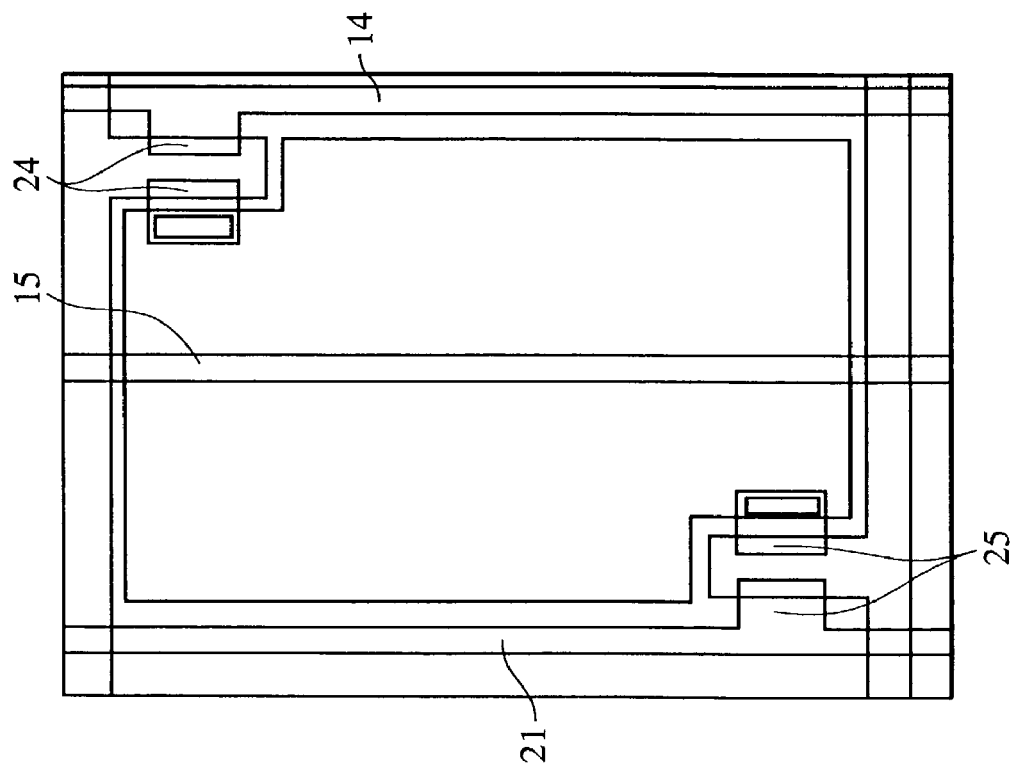

Furthermore, as shown in FIG. 6B, the respective elements are isolated from each other by means of photolithography using RIE. After that, a SiN film serving as the protective film is deposited to a thickness of about 900 nm using a plasma CVD apparatus, and the SiN film is partially removed by means of photolithography using RIE so that interconnection pads or the like are exposed.

Thereafter, a fluorescent substance is bonded using an adhesive or the like, and thus a major part of the X-ray detecting apparatus according to the present invention is obtained.

Second Embodiment

In the below described second embodiment, a FPD-type X-ray detecting apparatus using MIS-type optical-to-electrical converters as in the first embodiment is disclosed. Compared with the X-ray detecting apparatus according to the first embodiment, the sensitivity of the X-ray detecting apparatus according to the second embodiment is further improved by increasing the aperture ratio, and the TFT driving circuit is simplified.

Figure 7:
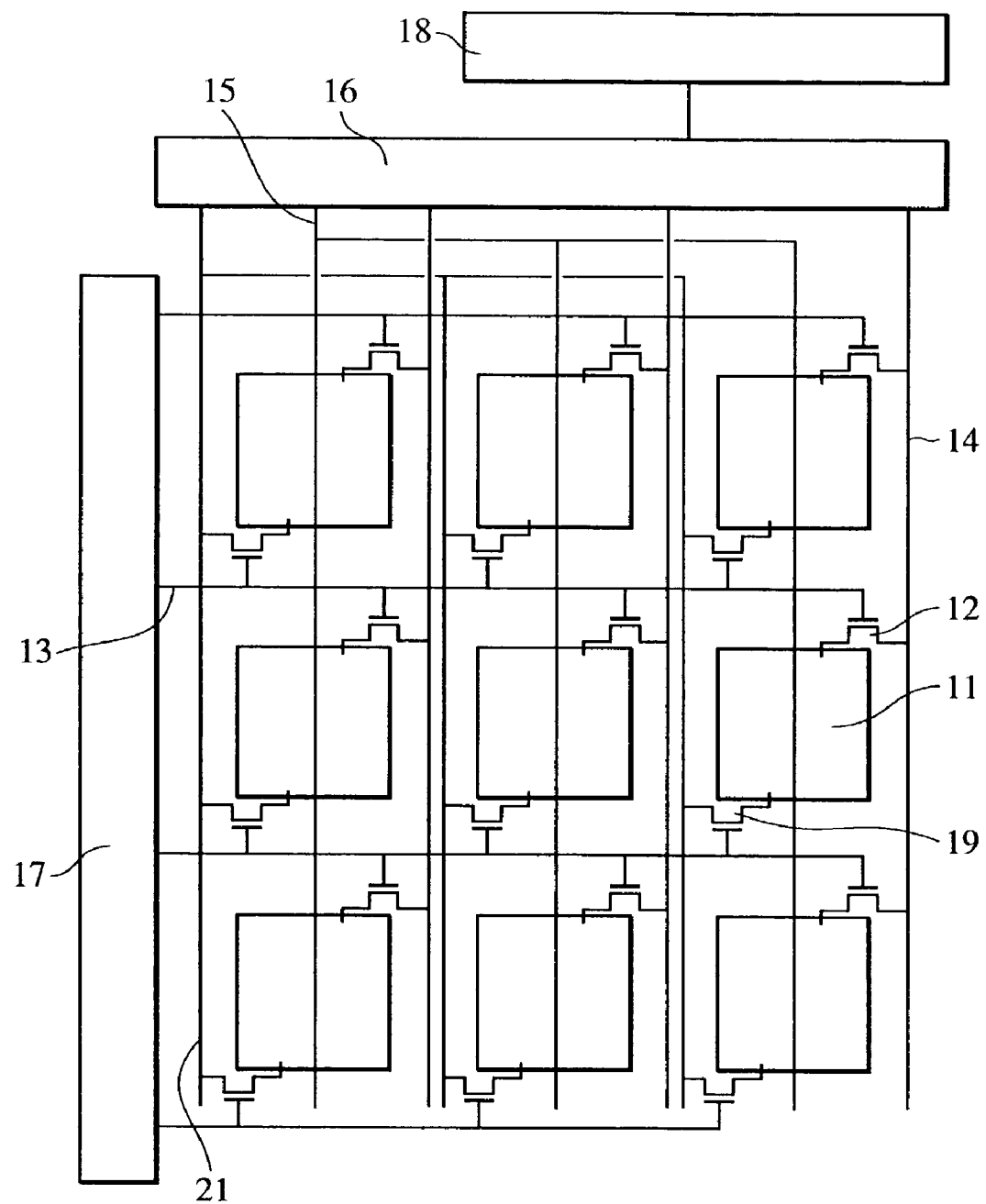
FIG. 7 is a circuit diagram showing an equivalent circuit of an X-ray detecting apparatus having a 3×3 matrix structure, according to a second embodiment.

FIG. 7 is a circuit diagram showing an equivalent circuit of an X-ray detecting apparatus having a 3×3 matrix structure according to the present embodiment. Although the X-ray detecting apparatus has the 3×3 matrix structure by way of example, the matrix structure may include greater numbers of rows and columns. For convenience, similar parts to those in the first embodiment are denoted by similar reference numerals or symbols.

In FIG. 7, reference numeral 11 denotes an individual MIS-type optical-to-electrical converter, 12 denotes a transfer TFT, 13 denotes a driving line for driving the transfer TFT or reset TFT, 14 denotes a signal line, 15 denote a bias line, 16 denotes a signal processing circuit, 17 denotes a TFT driving circuit, 18 denotes an A/D converter, 19 denotes a reset TFT, and 21 denotes a resetting line.

Incident X-ray radiation is converted into visible light by a wavelength conversion element such as a CsI or GOS, and the resultant visible light is incident on the MIS-type photoelectric conversion element 11. The incident light is converted into an electric charge by the MIS-type photoelectric conversion element 11, and the resultant electric charge is stored in the MIS-type photoelectric conversion element 11. Thereafter, the transfer TFT 12 of the current pixel is turned on to read the stored electric charge. The reset TFT 19 of the pixel is turned on, in synchronization with the operation of the transfer TFT at the following stage, thereby resetting the sensor.

Figure 8:
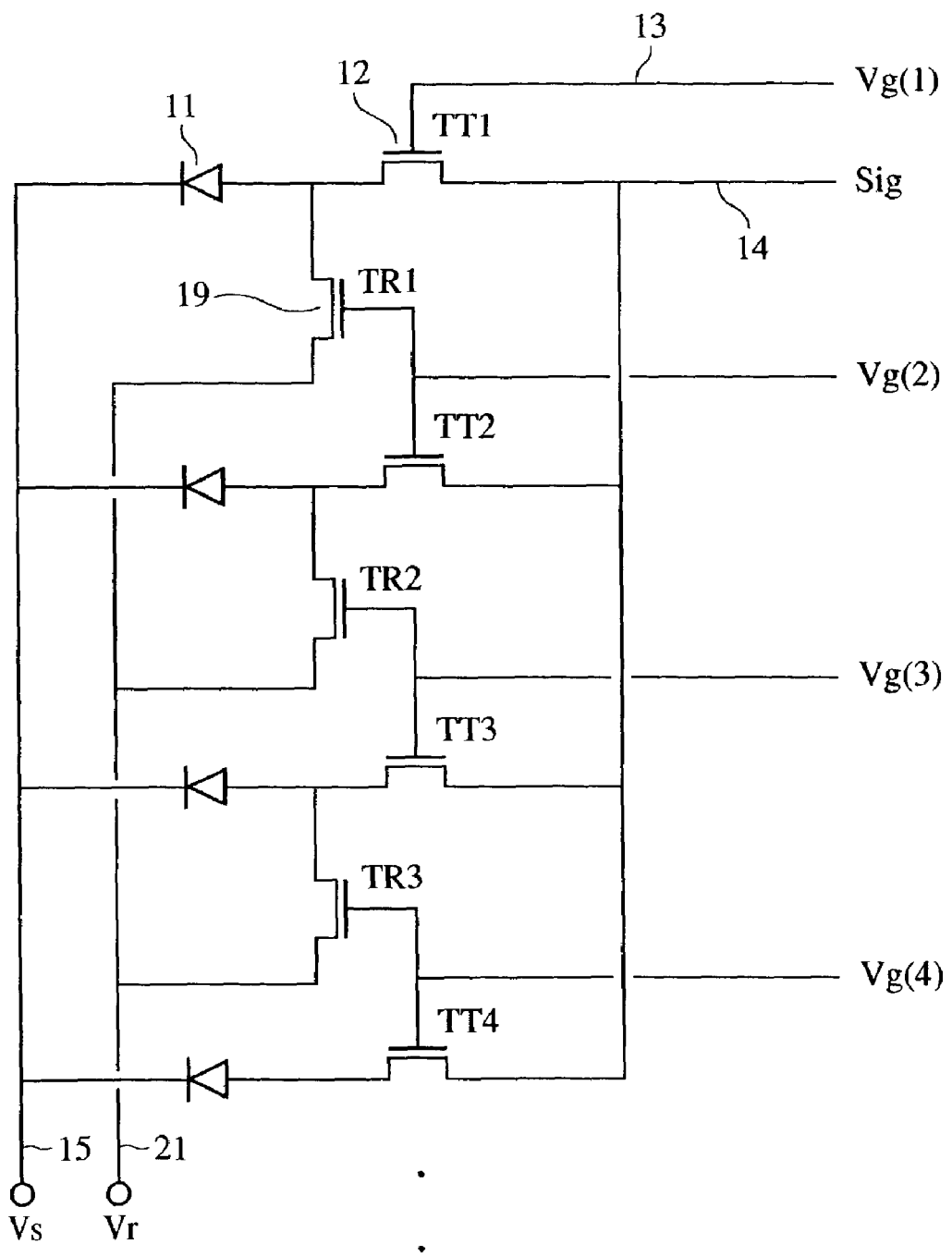
FIG. 8 is a circuit diagram showing an equivalent circuit of an X-ray detecting apparatus having a 3×1 matrix structure.

FIG. 8 is a circuit diagram showing an equivalent circuit of an X-ray detecting apparatus having a 3×1 matrix structure. In this figure, similar parts to those in FIG. 7 are denoted by similar reference numerals. When an on-voltage is applied to a transfer TFT TT1 via a node Vgt(1), a signal is output via a line Sig. Thereafter, an on-voltage is applied to a reset TFT TR1 via a node Vgr(1) to reset a sensor. Similarly, when an on-voltage is applied to a transfer TFT TT2 via a node Vg(t), a signal is output via the line Sig. Thereafter, an on-voltage is applied to a reset TFT TR2 via a node Vg(3) to reset a sensor. By performing the above-described operation repeatedly, a moving image is read.

Figure 9:
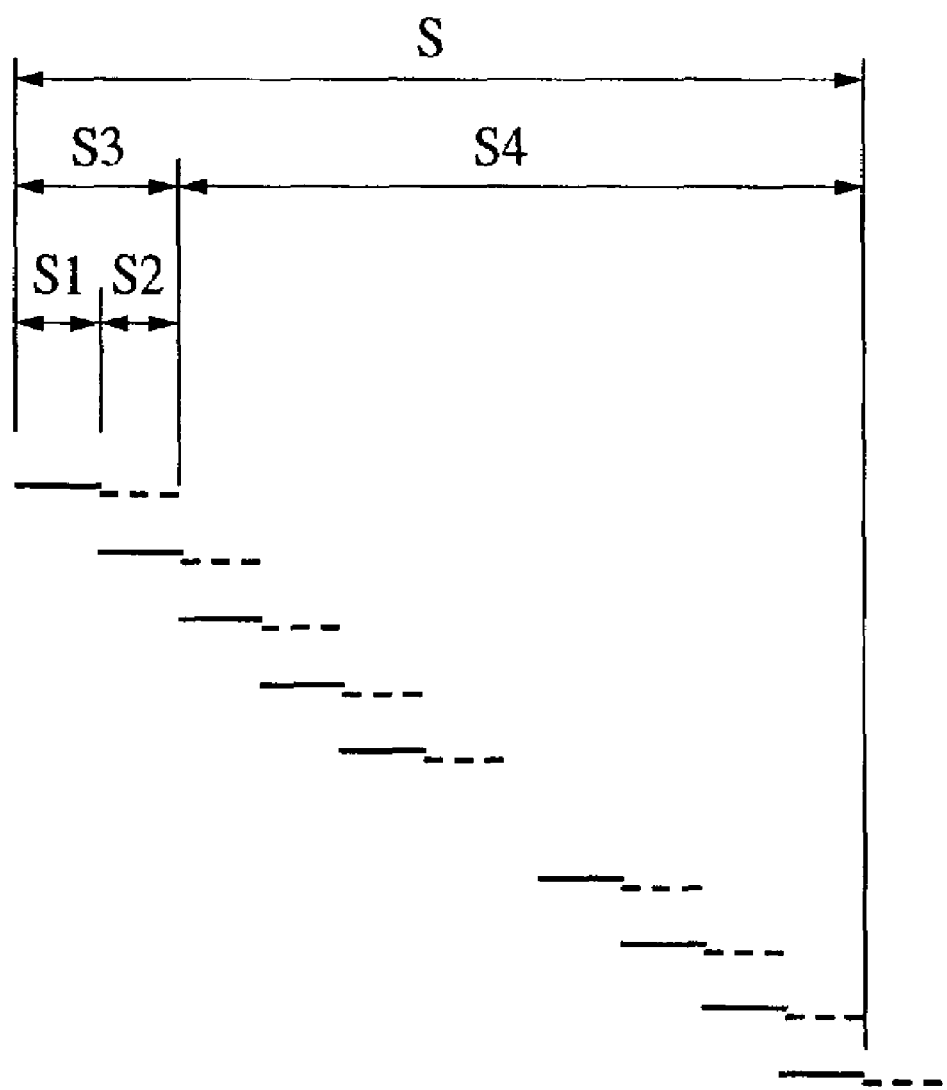
FIG. 9 is a diagram showing a method of driving the X-ray detecting apparatus having a 3×3 matrix according to the second embodiment.

FIG. 9 is a diagram showing a method of driving the X-ray detecting apparatus according to the present embodiment. In FIG. 9, reference symbol S1 denotes a period of time needed to read one line, S2 denotes a period of time needed to reset one line, S4 denotes a period of time needed to accumulate an electric charge into a sensor, and S denotes a period of time needed to perform the entire process on one frame.

In the present embodiment, unlike the conventional method in which sequential reading, and resetting and exposure to radiation for all pixels are performed repeatedly, reading, resetting, and storing are performed on a line-by-line basis, and thus the total driving time is substantially equal to the sum of reading times. That is, when reading and transferring of signals from pixels in one line are being performed, resetting of already-read pixels in a previous line is performed. This makes it possible to drive the X-ray detecting apparatus at a high driving rate of 30 FPS or higher to obtain a moving image without causing degradation in image quality.

Figure 10:
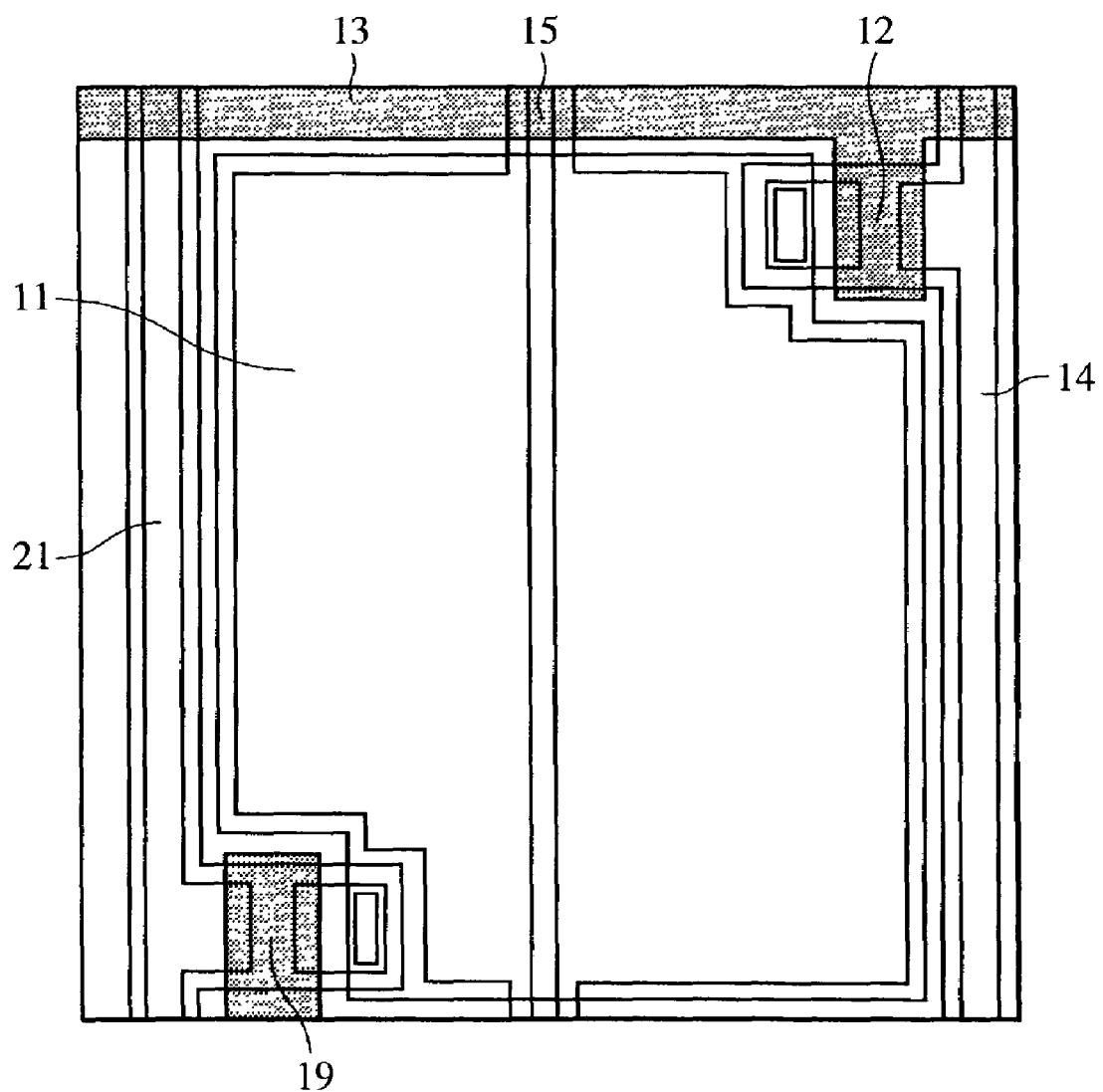
FIG. 10 is a plan view showing one pixel of the X-ray detecting apparatus having a 3×3 matrix according to the second embodiment.

FIG. 10 is a plan view showing one pixel of the X-ray detecting apparatus according to the present embodiment. In FIG. 10, similar parts to those in FIG. 7 are denoted by similar reference numerals. In FIG. 10, the transfer TFT 12 and the reset TFT 19 are disposed in diagonally opposite corners of the pixel in order to achieve an optimum layout including the driving line and the signal line. In this structure, the on-time is the same for both the transfer TFT and the reset TFT, and thus it is not necessary required that the TFTs have the same driving capability, and the driving capability may be determined depending on the driving method or the image quality required.

In the present embodiment, the number of lines for driving TFTs is similar to that employed in the conventional technique, and it is possible to drive the X-ray detecting apparatus at a high driving rate to obtain a moving image without needing a significant modification of the peripheral circuits. Furthermore, the X-ray detecting apparatus according to the present embodiment can be easily produced by a simple method similar to that employed in the first embodiment.

In the first and second embodiments described above, the MIS-type optical-to-electrical converter is employed by way of example as the photoelectric conversion means. Alternatively, a PIN PD may be employed for the same purpose.

Third Embodiment

In the below described third embodiment, a direct conversion technique for directly converting radiation to an electric charge, storing the obtained electric charge, and reading the electric charge using a transfer TFT is disclosed.

Figure 11:
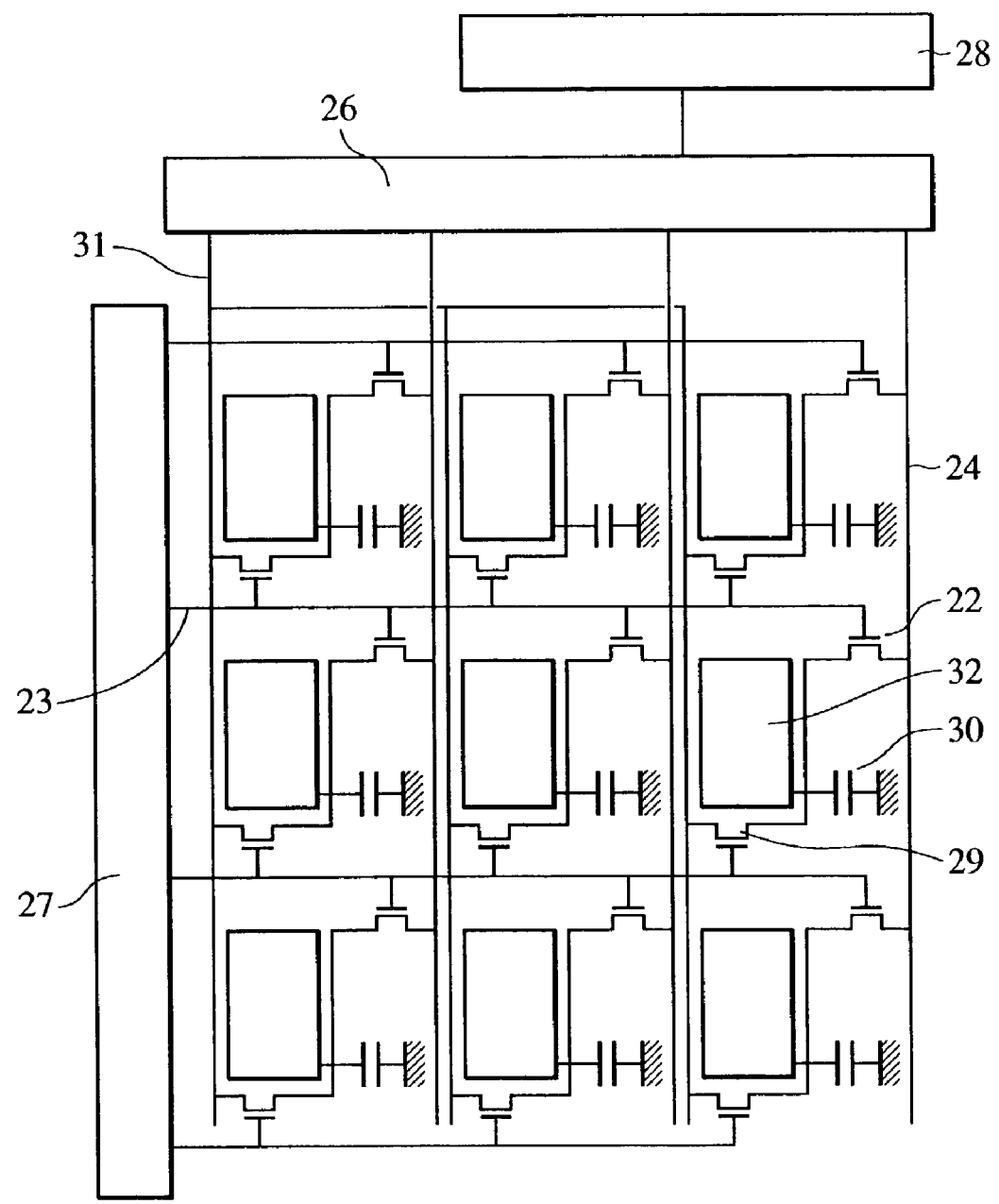
FIG. 11 is a circuit diagram showing an equivalent circuit of an X-ray detecting apparatus having a 3×3 matrix structure, according to a third embodiment.

FIG. 11 is a circuit diagram showing an equivalent circuit of an X-ray detecting apparatus having a 3×3 matrix structure according to the present embodiment. Although the X-ray detecting apparatus has the 3×3 matrix structure by way of example, the matrix structure may include greater numbers of rows and columns.

In FIG. 11, reference numeral 32 denotes an individual electrode for collecting an electric charge generated in the direct radiation conversion element, 30 denotes a storage capacitor, 22 denotes a transfer TFT, 23 denotes a driving line for driving the transfer TFT and the reset TFT, 24 denotes a signal line, 26 denotes a signal processing circuit, 27 denotes a TFT driving circuit, 28 denotes an A/D converter, 29 denotes a reset TFT, and 31 denotes a resetting line.

Figure 12:
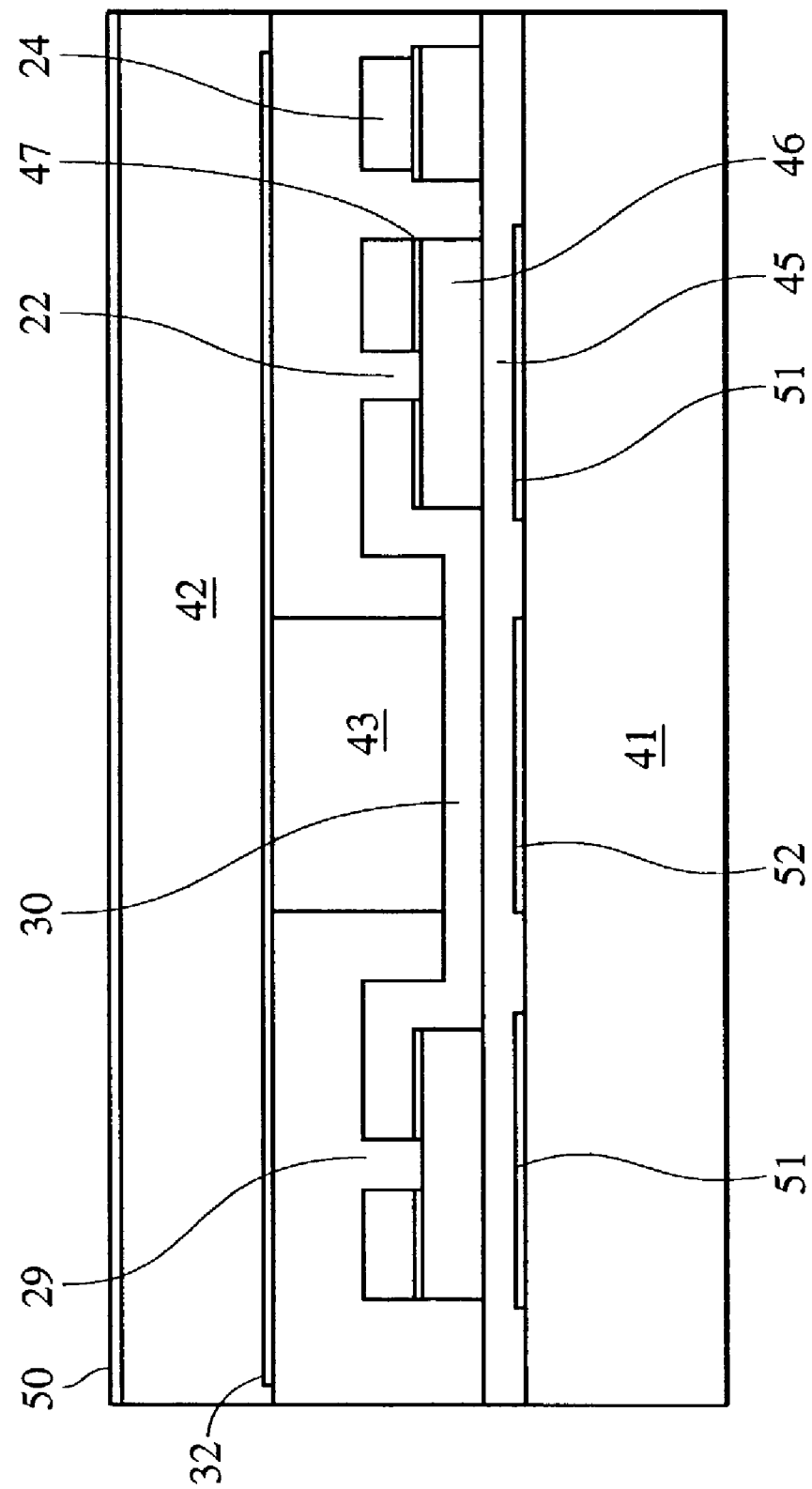
FIG. 12 is a cross-sectional view showing a pixel and nearby portions of the X-ray detecting apparatus according to the third embodiment.
Figure 13:
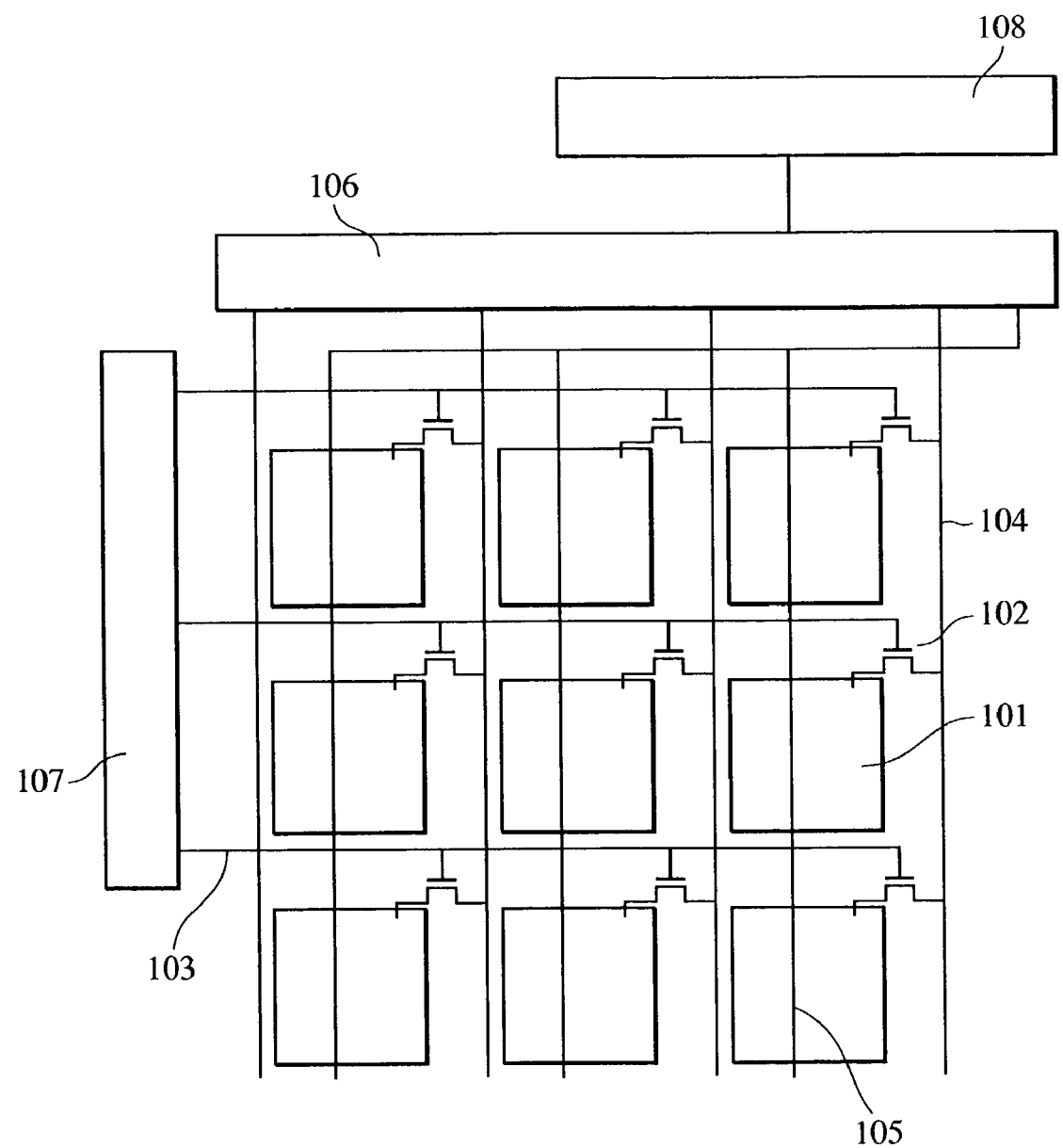
FIG. 13 is a circuit diagram showing an equivalent circuit of a conventional X-ray detecting apparatus in the form of an FPD.
Figure 14:
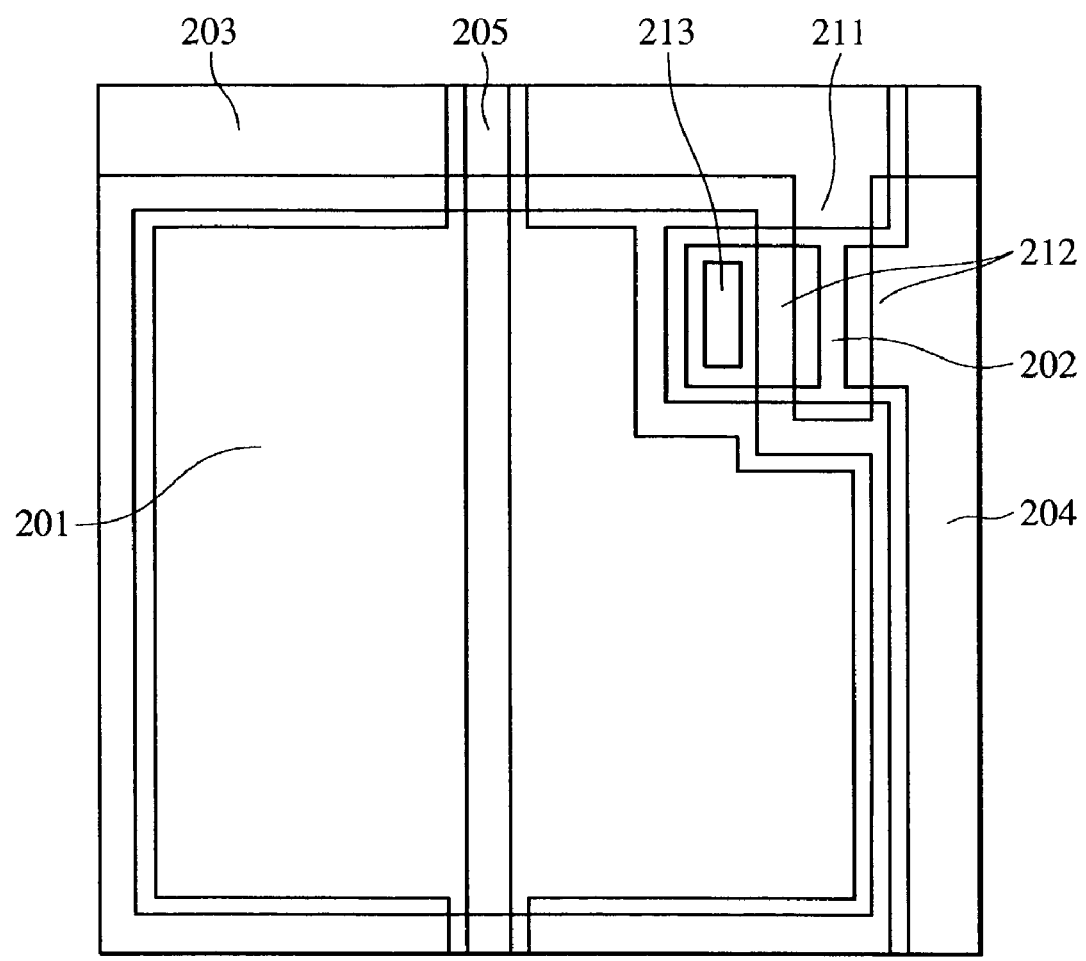
FIG. 14 is a plan view of one pixel including a MIS-type optical-to-electrical converter of a conventional X-ray detecting apparatus.
Figure 15:
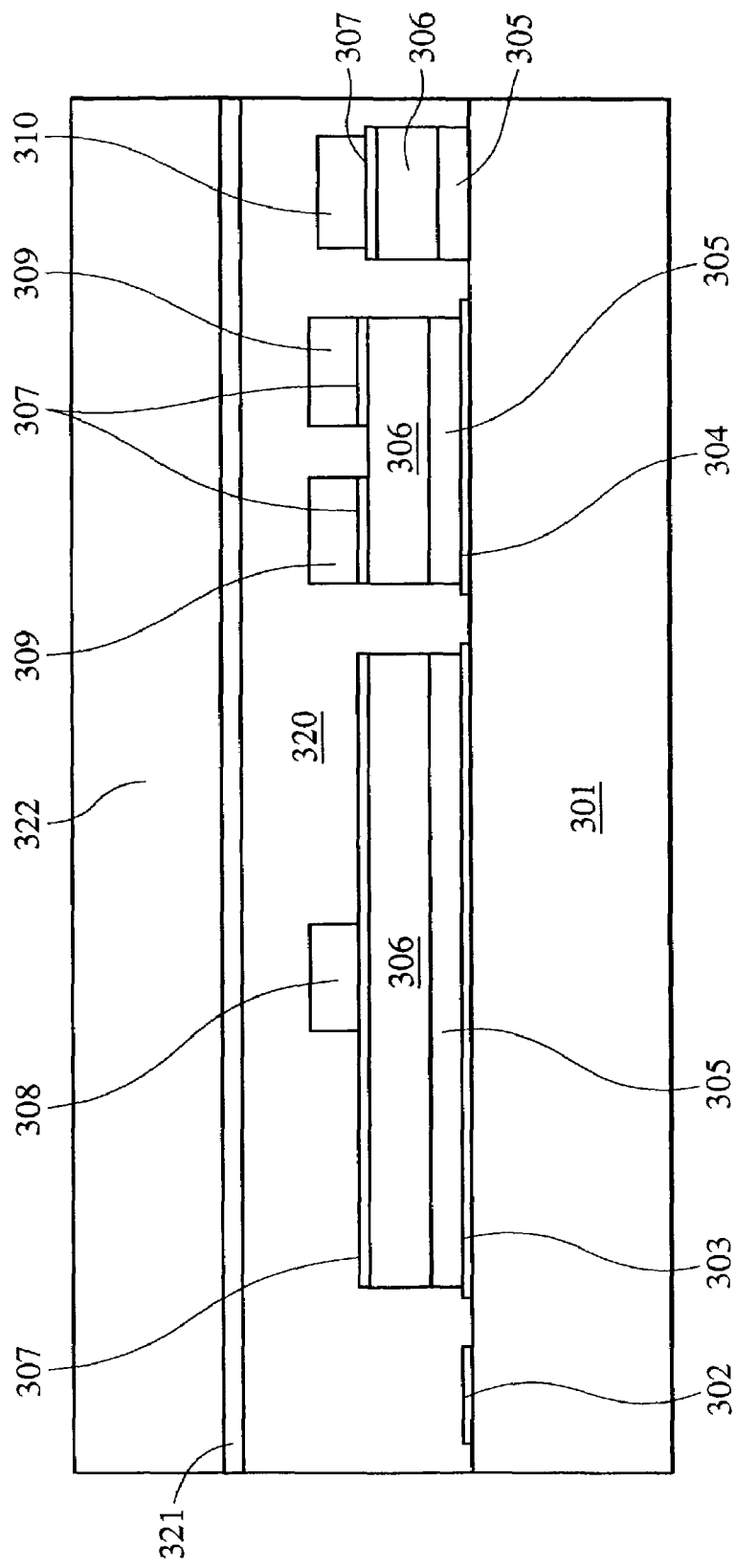
FIG. 15 is a cross-sectional view of one pixel including various devices shown in FIG. 14.
Figure 16:
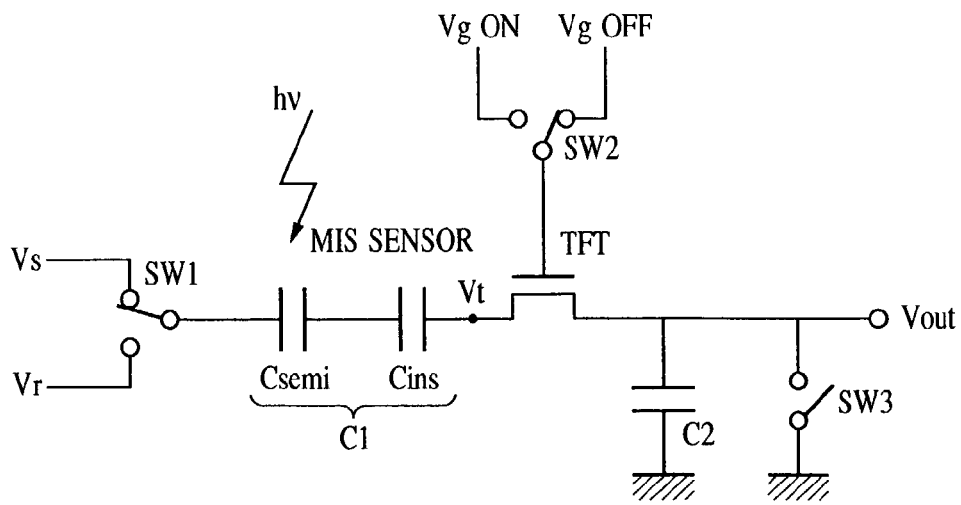
FIG. 16 is a circuit diagram showing an equivalent circuit of a one-bit portion of a conventional X-ray detecting apparatus using MIS-type optical-to-electrical converters.
Figure 17:
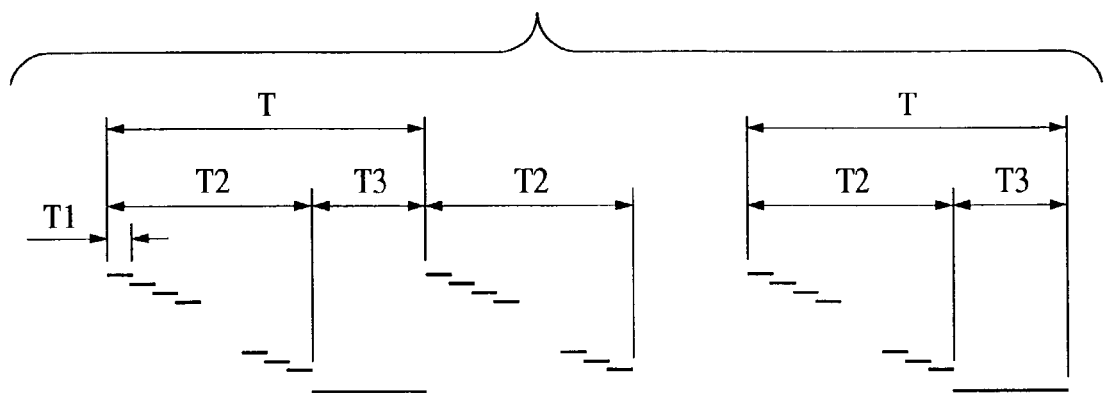
FIG. 17 is a diagram showing a method of driving the FPD type X-ray detecting apparatus according to the conventional technique.

FIG. 12 is a cross-sectional view showing a pixel and nearby portions of the X-ray detecting apparatus according to the present embodiment. In FIG. 12, reference numeral 41 denotes a glass substrate, 42 denotes a direct radiation conversion element made of amorphous selenium or GaAs, 50 denotes a common electrode, and 32 denotes an individual electrode. Reference numeral 43 denotes a connection element in the form of a bump made of electrically conductive resin. 51 denotes a gate electrode of the transfer TFT or the reset TFT, 45, 46 and 47 denote a gate insulating film, an active layer, and an ohmic contact layer, respectively, of the transfer TFT or the reset TFT, and 52 denotes a lower electrode of the storage capacitor.

Incident X-ray radiation is converted by the direct radiation conversion element 42 to an electric charge and collected into the individual electrode 32. The collected electric charge is stored in the storage capacitor 30 via the connection element in the form of the bump 43. Thereafter, the transfer TFT 22 is turned on to read the stored electric charge via the signal line 24. After that, when the transfer TFT at the following stage is turned on, the reset TFT 29 is turned on at the same time, thereby resetting the sensor and the storage capacitor.

Also in the present embodiment, great advantages similar to those obtained in the first or second embodiment are obtained, and it is possible to easily obtain a high-quality moving image.

Fourth Embodiment

Figure 20:
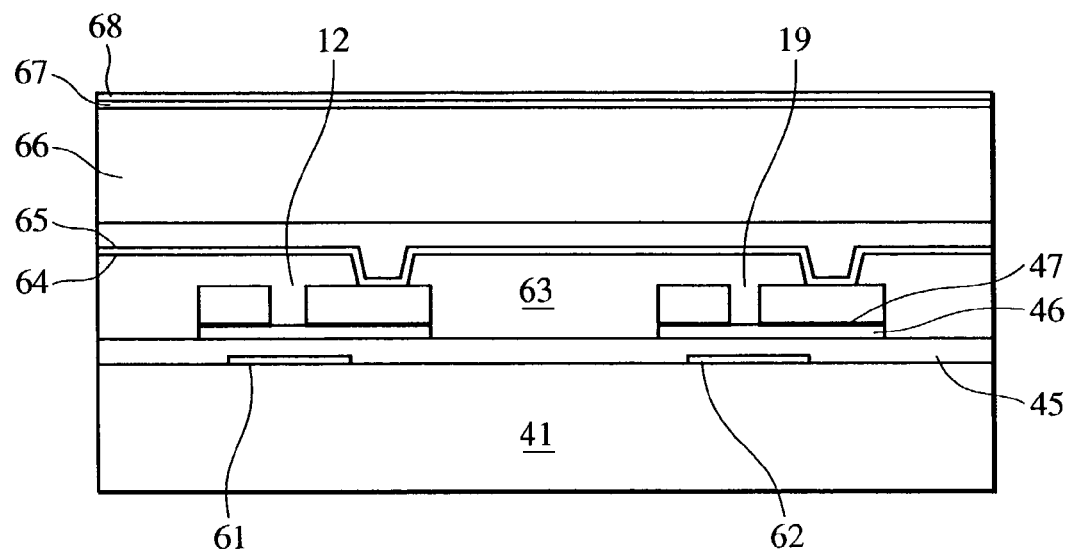
FIG. 20 is a cross-sectional view of a radiation detecting apparatus according to a fourth embodiment.

Referring to a cross sectional view shown in FIG. 20, an radiation detecting apparatus according to a fourth embodiment is described below. In this fourth embodiment, a MIS-type optical-to-electrical converter is formed on a transfer TFT and also on a reset TFT via a planarizing film into a multilayer structure. In FIG. 20, reference numeral 41 denotes an insulating substrate made of glass or the like, 61 denotes a gate electrode of the transfer TFT, 62 denotes a gate electrode of the reset TFT, 45 denotes a gate insulating film, 46 denotes a semiconductor layer, 47 denotes an ohmic contact layer, 63 denotes a planarizing film, 64 denotes a first electrode layer of the optical-to-electrical converter, 65 denotes an insulating layer, 66 denotes a semiconductor layer, 67 denotes an ohmic contact layer, and 68 denotes a second electrode layer. The equivalent circuit of the X-ray detecting apparatus having a 3×3 matrix structure according to the present embodiment is similar to that shown in FIG. 1, and the equivalent circuit of the X-ray detecting apparatus having a 3×1 matrix structure according to the present embodiment is similar to that shown in FIG. 2.

In the X-ray detecting apparatus constructed in the above-described manner, because the optical-to-electric converters are formed on driving elements such as TFTs into the multilayer structure, the aperture ratio is improved, and the driver circuit including TFTs is simplified. In particular, in the case in which the MIS-type optical-to-electrical converter is used as the optical-to-electrical converter, after forming the planarizing film 63, the contact hole is formed and the first electrode layer and the electrode of the TFT are connected to each other via the contact hole, and thus the planarizing film makes it possible to reduce the thickness of the insulating film of the MIS-type optical-to-electrical converter thereby improving the sensitivity. Thus, this structure is especially desirable.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims it is be accorded the broadest interpretation so as to encompass all such modifications and equivalent structures and functions.

What is claimed is:

1. A radiation detecting apparatus comprising:
   a plurality of pixels, each pixel including (i) a conversion element configured to convert radiation into an electric signal, (ii) a resetting element configured to reset said conversion element by applying a voltage to said conversion element, and (iii) a signal transfer element connected to said conversion element,
   wherein said signal transfer element and said resetting element are connected to the same electrode of said conversion element, and
   wherein said conversion element is formed on said signal transfer element and on said resetting element via a planarizing layer, and said same electrode is formed on said planarizing layer.

2. A radiation detecting apparatus according to claim 1, wherein said signal transfer element and said resetting element are each formed of a thin-film transistor.

3. A radiation detecting apparatus according to claim 1, wherein the pixels are arranged in an array having rows, and a transfer operation for a row is performed by said signal transfer element in a period of time in which said resetting element resets an immediately preceding row which has been subjected to the transfer operation.

4. A radiation detecting apparatus according to claim 1, wherein said conversion element is formed of layers including an electrode layer, an insulating layer, a semiconductor layer, and a carrier blocking layer such that said conversion element has the same layer structure as said transfer element.

5. A radiation detecting apparatus according to claim 1, wherein said conversion element is formed on non-single crystal silicon.

6. A radiation detecting apparatus according to claim 1, further comprising a wavelength conversion element of CsI or GOS for converting radiation to visible light.

7. A radiation detecting apparatus according to claim 1, wherein said conversion element includes a member for directly converting radiation to an electric charge.

8. A radiation detecting apparatus comprising:
an array of pixels having a plurality of rows, each pixel including (i) detection means for detecting radiation, (ii) transfer means for transferring a detected signal, and (iii) resetting means for resetting said detection means by applying a voltage to said detection means,
wherein said transfer means and said resetting means are connected to a same electrode of said detection means, and wherein said detection means is formed on said transfer means and on said resetting means via a planarizing layer, and said same electrode is formed on said planarizing layer.

* * * * *

UNITED STATES PATENT AND TRADEMARK OFFICE
CERTIFICATE OF CORRECTION

PATENT NO. : 7,034,309 B2 Page 1 of 1
APPLICATION NO. : 10/290530
DATED : April 25, 2006
INVENTOR(S) : Chiori Mochizuki It is certified that error appears in the above-identified patent and that said Letters Patent is hereby corrected as shown below:

COLUMN 4:
Line 39, "refer" should read -- reference --.

COLUMN 5:
Line 58, "line 14" should read -- line, 14 --.

COLUMN 7:
Line 67, "denote" should read -- denotes --.

COLUMN 8:
Line 57, "necessary" should read -- necessarily --.

COLUMN 9:
Line 60, "FIG. 20 an" should read -- FIG. 20 a --.

COLUMN 11:
Line 2, "on" should read -- of --.

Signed and Sealed this

Thirtieth Day of January, 2007

JON W. DUDAS
*Director of the United States Patent and Trademark Office*